US010660313B1

(12) United States Patent
Riley

(10) Patent No.: US 10,660,313 B1
(45) Date of Patent: May 26, 2020

(54) BEHAVIOR-DETERRING COLLAR WITH EMERGENCY OVERRIDE

(71) Applicant: Thomas R. Riley, Greenwood, SC (US)

(72) Inventor: Thomas R. Riley, Greenwood, SC (US)

(*) Notice: Subject to any disclaimer, the term of this patent is extended or adjusted under 35 U.S.C. 154(b) by 0 days.

(21) Appl. No.: 16/120,420

(22) Filed: Sep. 3, 2018

Related U.S. Application Data

(63) Continuation of application No. 14/815,960, filed on Aug. 1, 2015, now Pat. No. 10,064,391.

(Continued)

(51) Int. Cl.
| | | |
|---|---|---|
| *G08B 7/06* | (2006.01) | |
| *G08B 21/00* | (2006.01) | |
| *A01K 29/00* | (2006.01) | |
| *A01K 15/02* | (2006.01) | |
| *A01K 27/00* | (2006.01) | |
| *G08B 25/00* | (2006.01) | |
| *G08B 19/00* | (2006.01) | |
| *G08B 1/08* | (2006.01) | |
| *G08B 29/18* | (2006.01) | |
| *G08B 29/14* | (2006.01) | |
| *G08B 29/12* | (2006.01) | |
| *G08B 21/22* | (2006.01) | |

(Continued)

(52) U.S. Cl.
CPC .......... *A01K 27/009* (2013.01); *A01K 15/021* (2013.01); *A01K 15/022* (2013.01); *A01K 15/023* (2013.01); *A01K 15/029* (2013.01); *A01K 27/001* (2013.01); *G08B 1/08* (2013.01); *G08B 7/06* (2013.01); *G08B 19/00* (2013.01); *G08B 25/001* (2013.01); *G08B 25/009* (2013.01); *G08B 21/0269* (2013.01); *G08B 21/0272* (2013.01); *G08B 21/22* (2013.01); *G08B 29/123* (2013.01); *G08B 29/126* (2013.01); *G08B 29/145* (2013.01); *G08B 29/183* (2013.01); *H04W 84/12* (2013.01)

(58) Field of Classification Search
USPC .......... 119/721, 859, 908, 712, 718; 342/357.31, 357.74, 450; 340/573.1
See application file for complete search history.

(56) References Cited

U.S. PATENT DOCUMENTS

| | | |
|---|---|---|
| 4,202,293 A | 5/1980 | Gonda et al. |
| 4,887,549 A | 12/1989 | Powell |

(Continued)

*Primary Examiner* — Yvonne R Abbott-Lewis
(74) *Attorney, Agent, or Firm* — Charlotte C. Wilson

(57) ABSTRACT

A pet collar is provided with a collar command unit, which may include a stimulator feature for discouraging undesirable behavior and a sensor for detecting the undesirable behavior. A controller in the collar command unit electronically communicates with the stimulator and the sensor. The collar command unit also includes a receiver for receiving an event signal from a remote device, such as a building occupant protection system or cellular telephone, which is indicative of an emergency situation. When the pet exhibits the undesirable behavior, the controller allows the stimulator to deliver a deterrent stimulus. However, when the event signal is received, the controller overrides the stimulator feature, preventing the delivery of the deterrent stimulus to the pet. Additionally or alternately, the collar may include a transmitter for transmitting a response to the remote device and a tracking chip for tracking the location of the pet during or after the event.

17 Claims, 9 Drawing Sheets

Related U.S. Application Data

(60) Provisional application No. 62/053,130, filed on Sep. 20, 2014, provisional application No. 62/032,105, filed on Aug. 1, 2014.

(51) Int. Cl.
*G08B 21/02* (2006.01)
*H04W 84/12* (2009.01)

(56) References Cited

U.S. PATENT DOCUMENTS

| | | | | |
|---|---|---|---|---|
| 5,642,690 A * | 7/1997 | Calabrese | ............ | A01K 15/023 119/721 |
| 5,794,569 A | 8/1998 | Titus et al. | | |
| 6,067,018 A | 5/2000 | Skelton et al. | | |
| 6,415,742 B1 * | 7/2002 | Lee | ............ | A01K 15/023 119/719 |
| 6,431,121 B1 * | 8/2002 | Mainini | ............ | A01K 15/022 119/718 |
| 6,581,546 B1 * | 6/2003 | Dalland | ............ | A01K 15/023 119/712 |
| 6,615,770 B2 * | 9/2003 | Patterson | ............ | A01K 15/021 119/719 |
| 6,923,146 B2 * | 8/2005 | Kobitz | ............ | A01K 15/023 119/721 |
| 7,000,570 B2 * | 2/2006 | Napolez | ............ | A01K 15/022 119/718 |
| 7,059,275 B2 * | 6/2006 | Laitinen | ............ | A01K 11/008 119/720 |
| 7,420,473 B2 | 9/2008 | Eicken et al. | | |
| 7,634,975 B2 | 12/2009 | Kates | | |
| 8,164,462 B1 * | 4/2012 | Bose | ............ | A01M 29/10 119/712 |
| 8,186,310 B1 * | 5/2012 | Smith | ............ | A01K 27/009 119/719 |
| 8,438,999 B2 | 5/2013 | Hardi et al. | | |
| 9,226,479 B2 | 1/2016 | Bianchi et al. | | |
| 9,258,982 B1 | 2/2016 | Golden | | |
| 9,652,975 B1 * | 5/2017 | Riley | ............ | A01K 15/022 |
| 9,743,643 B1 | 8/2017 | Kaplan et al. | | |
| 2007/0011339 A1 | 1/2007 | Brown | | |
| 2012/0026036 A1 | 2/2012 | Shaw et al. | | |

* cited by examiner

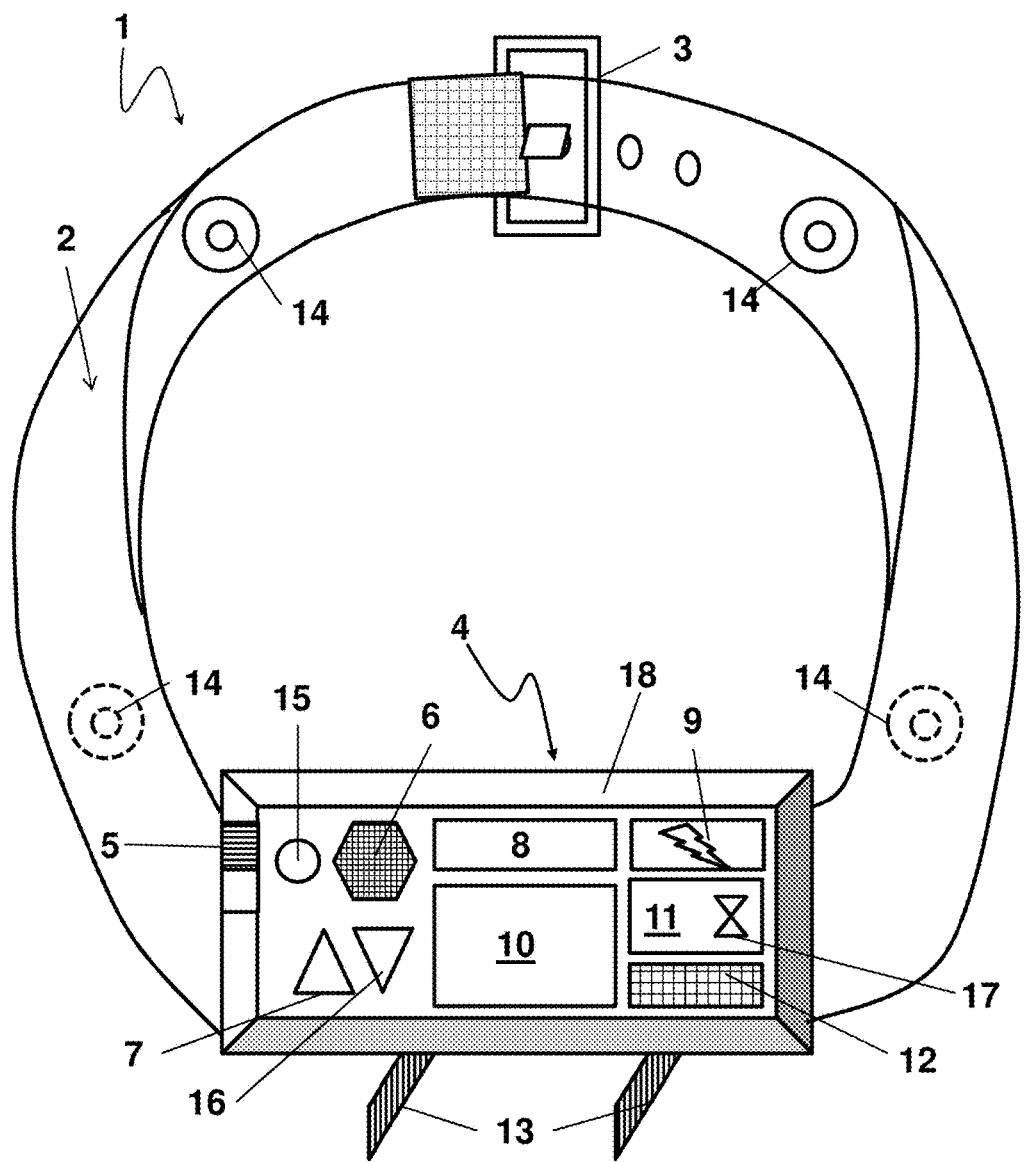
- FIG. 1 -

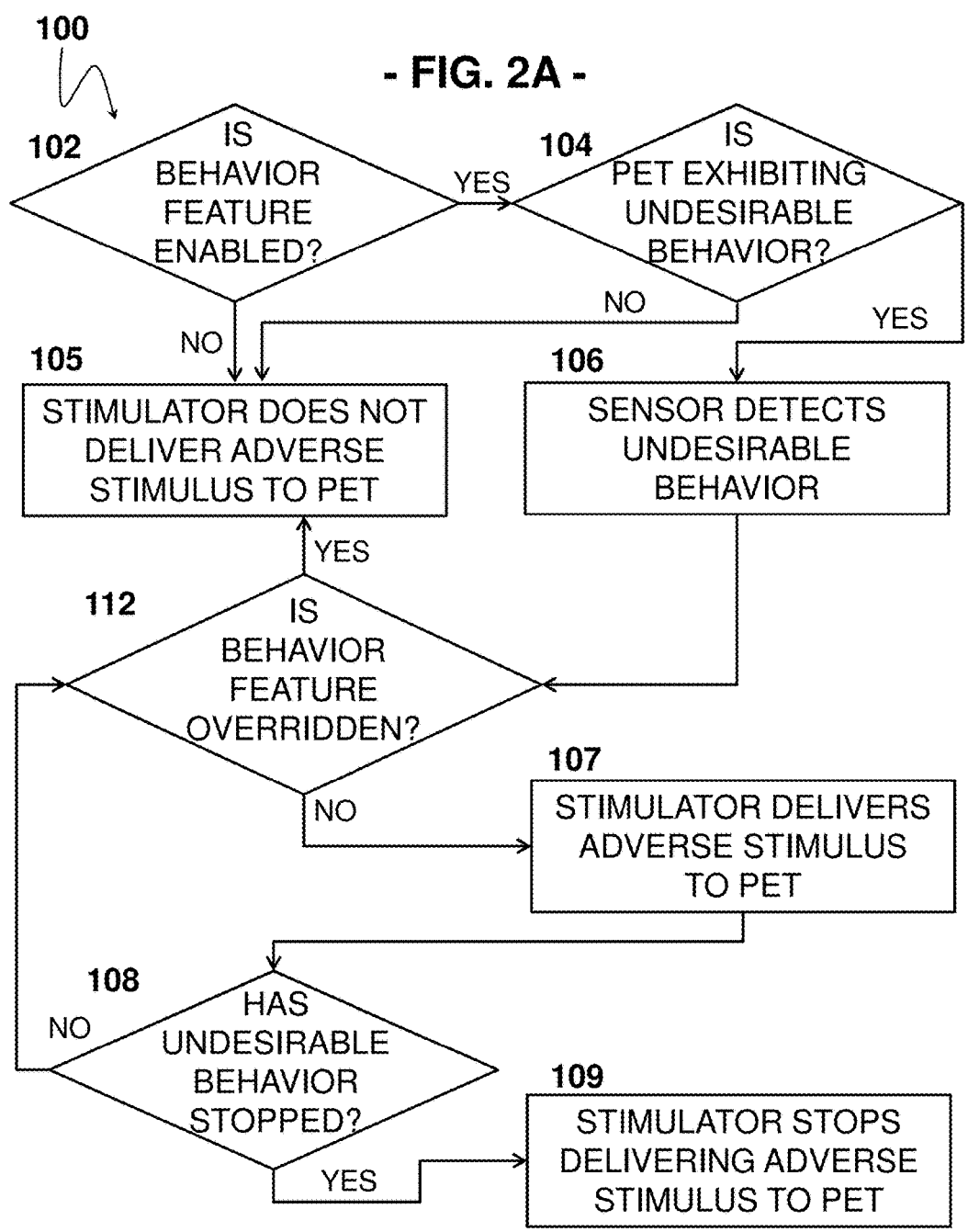

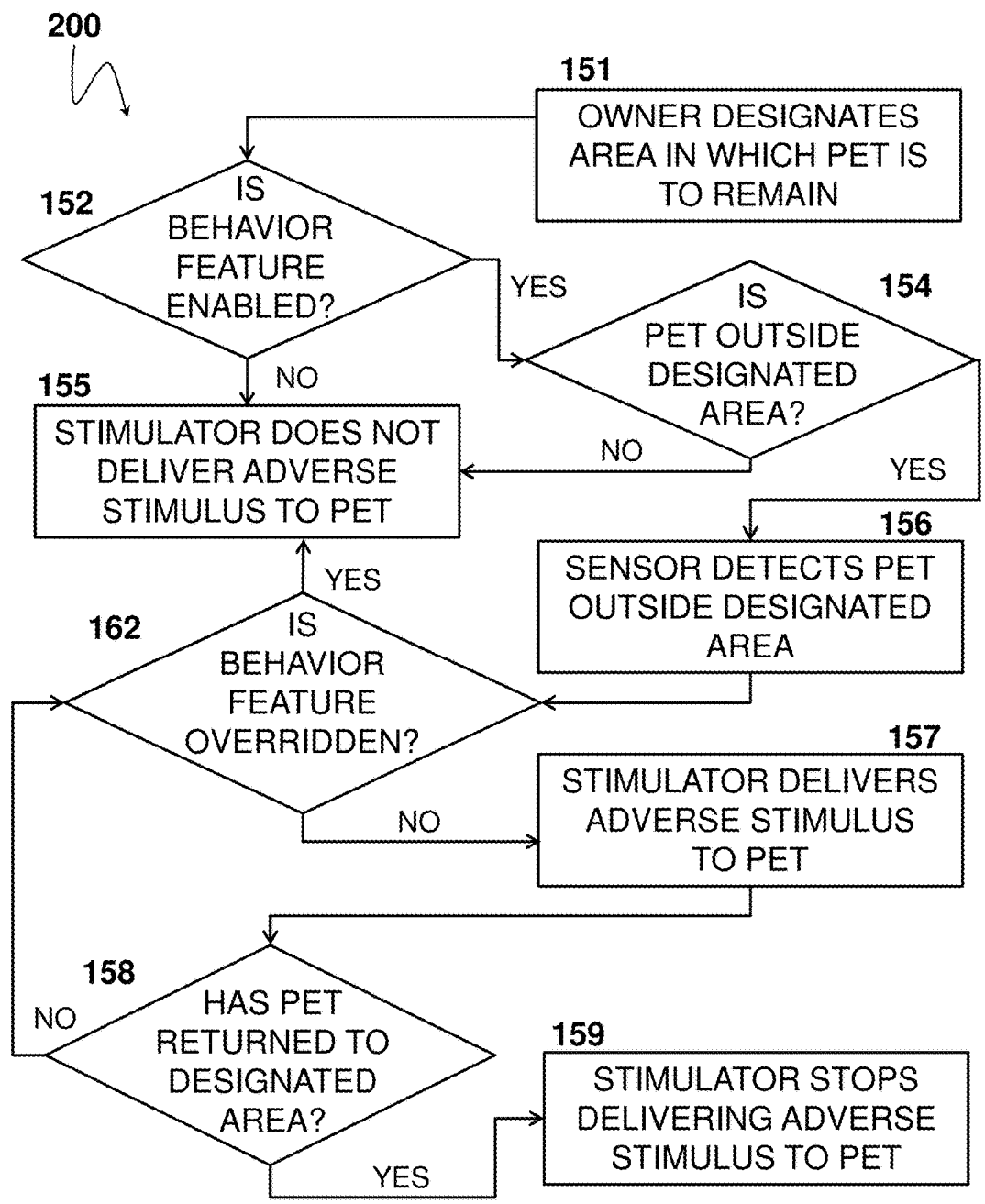
- FIG. 2B -

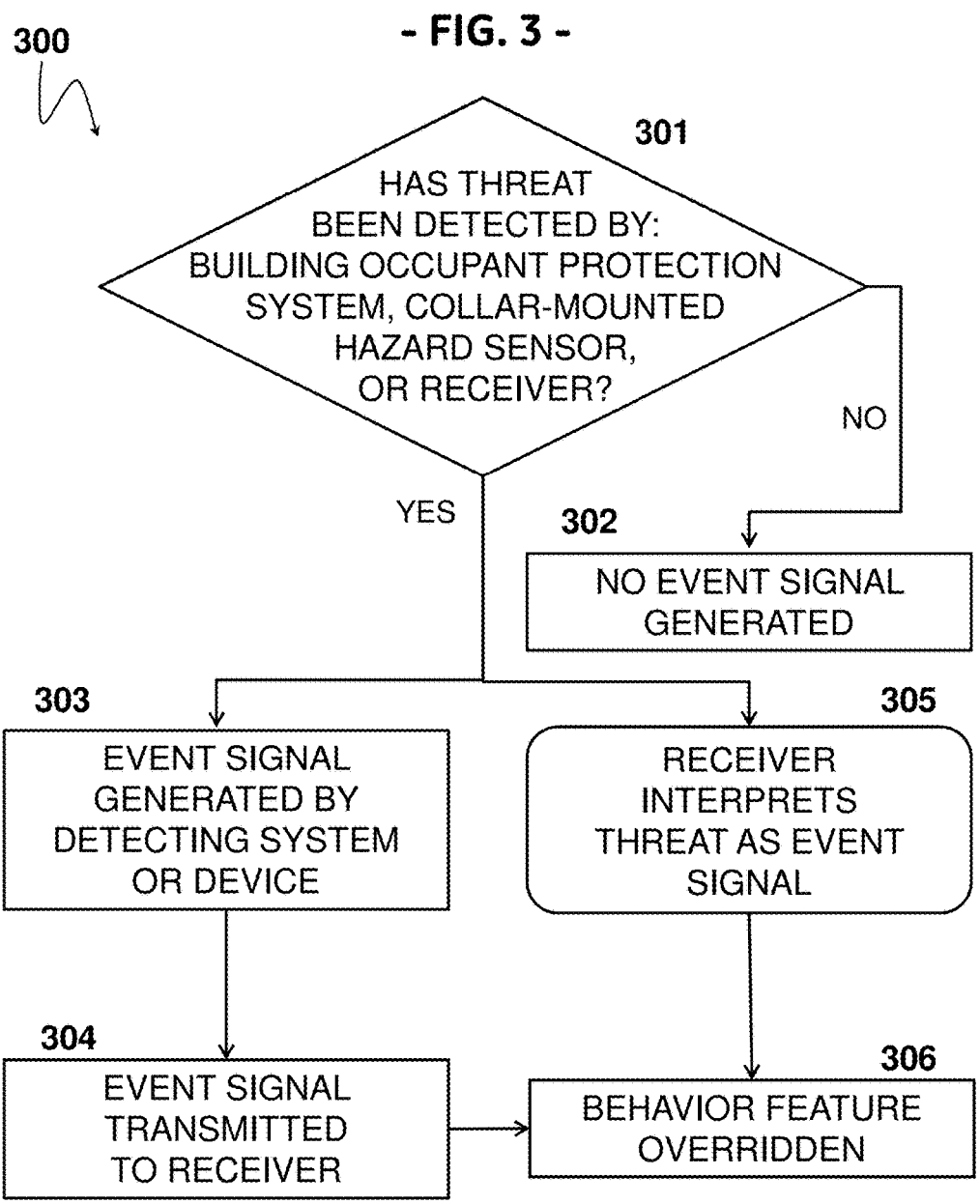

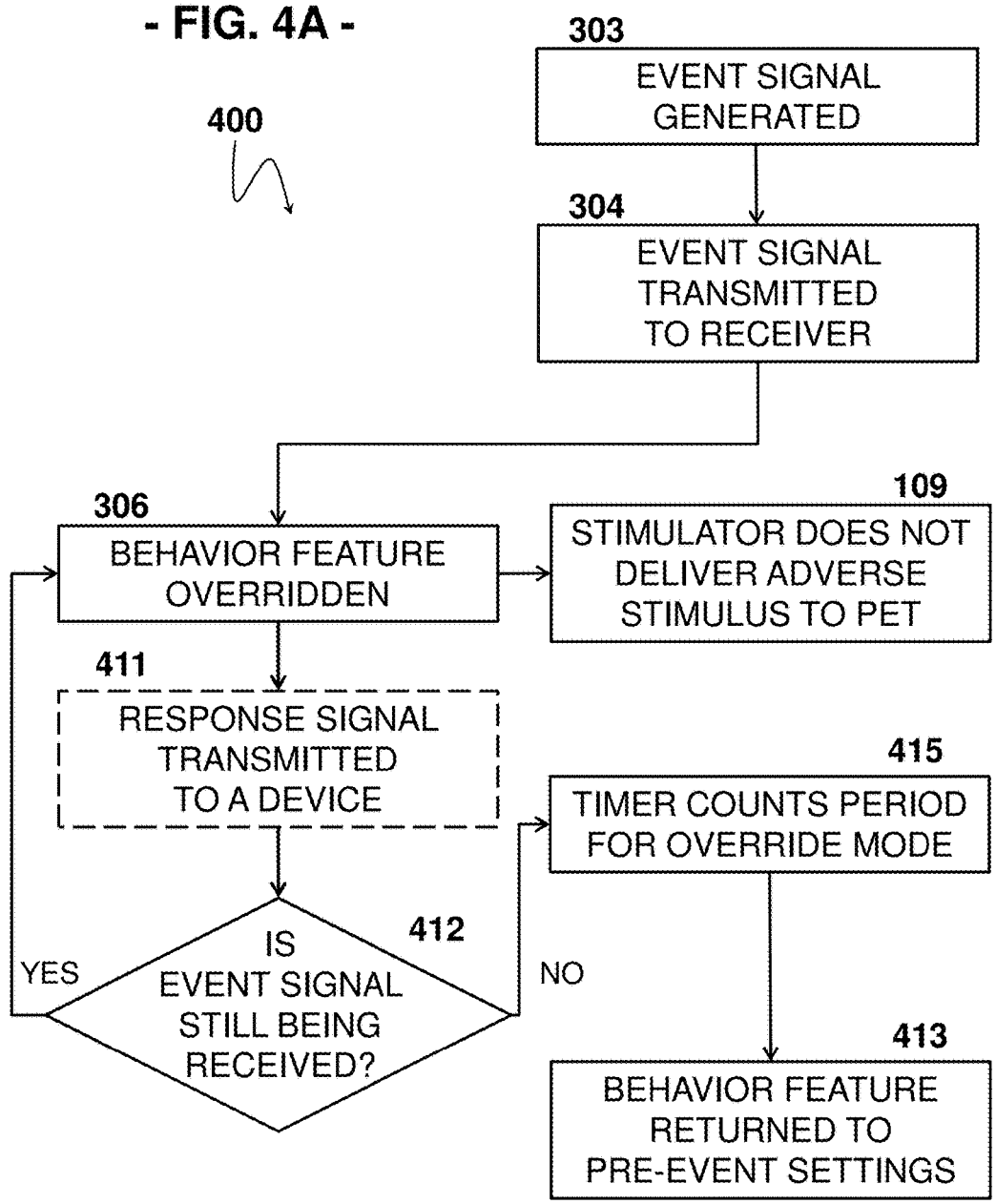

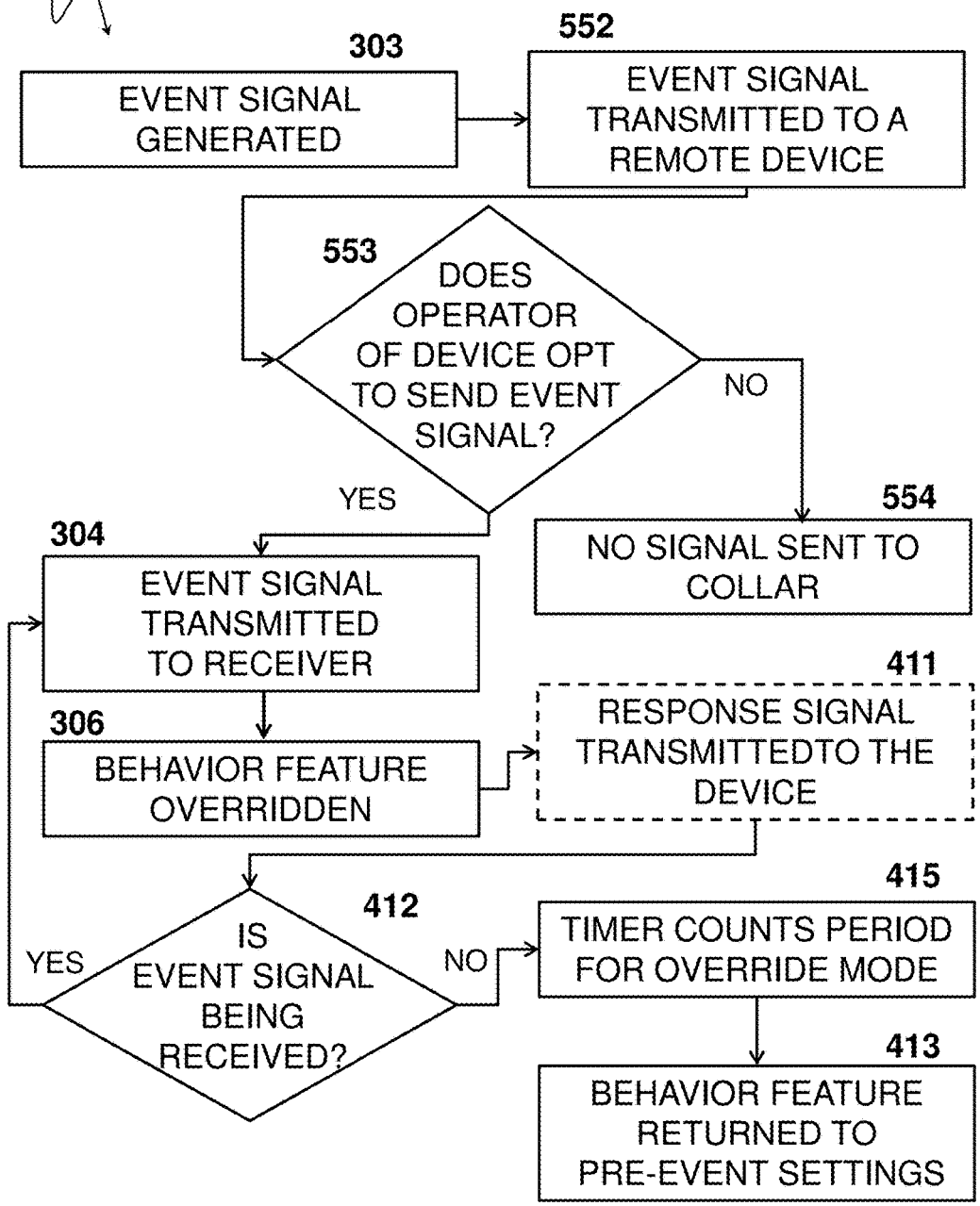

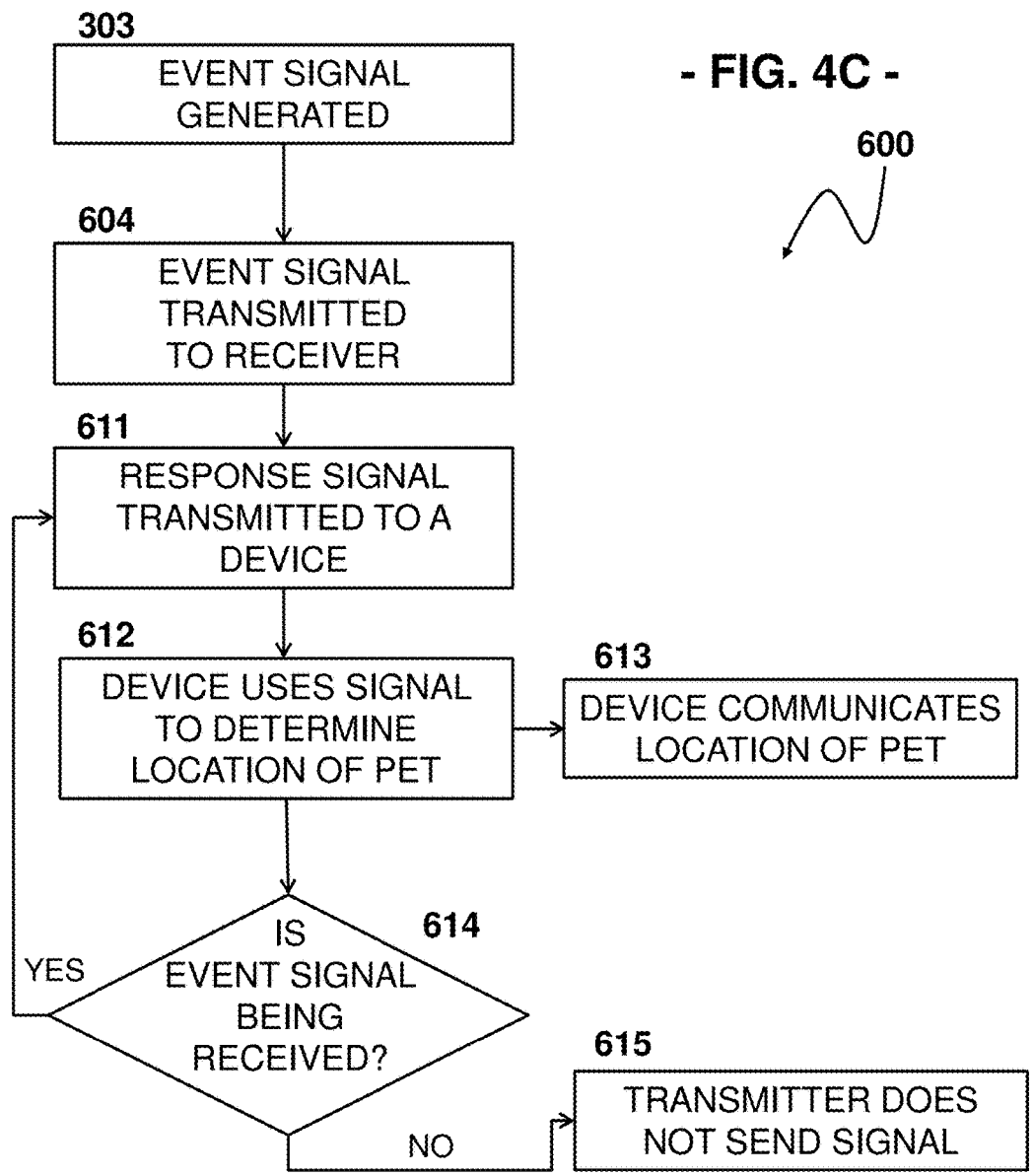

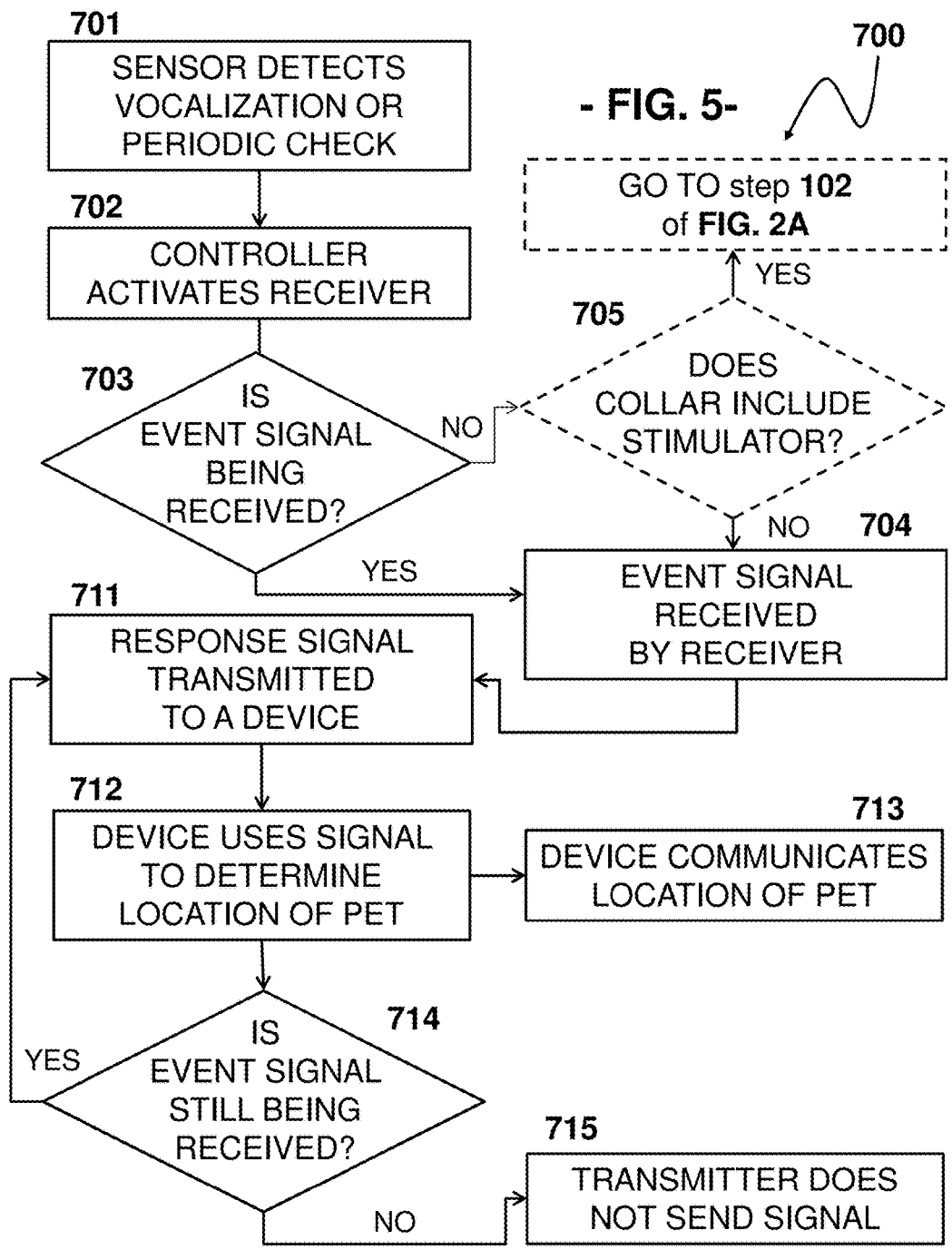

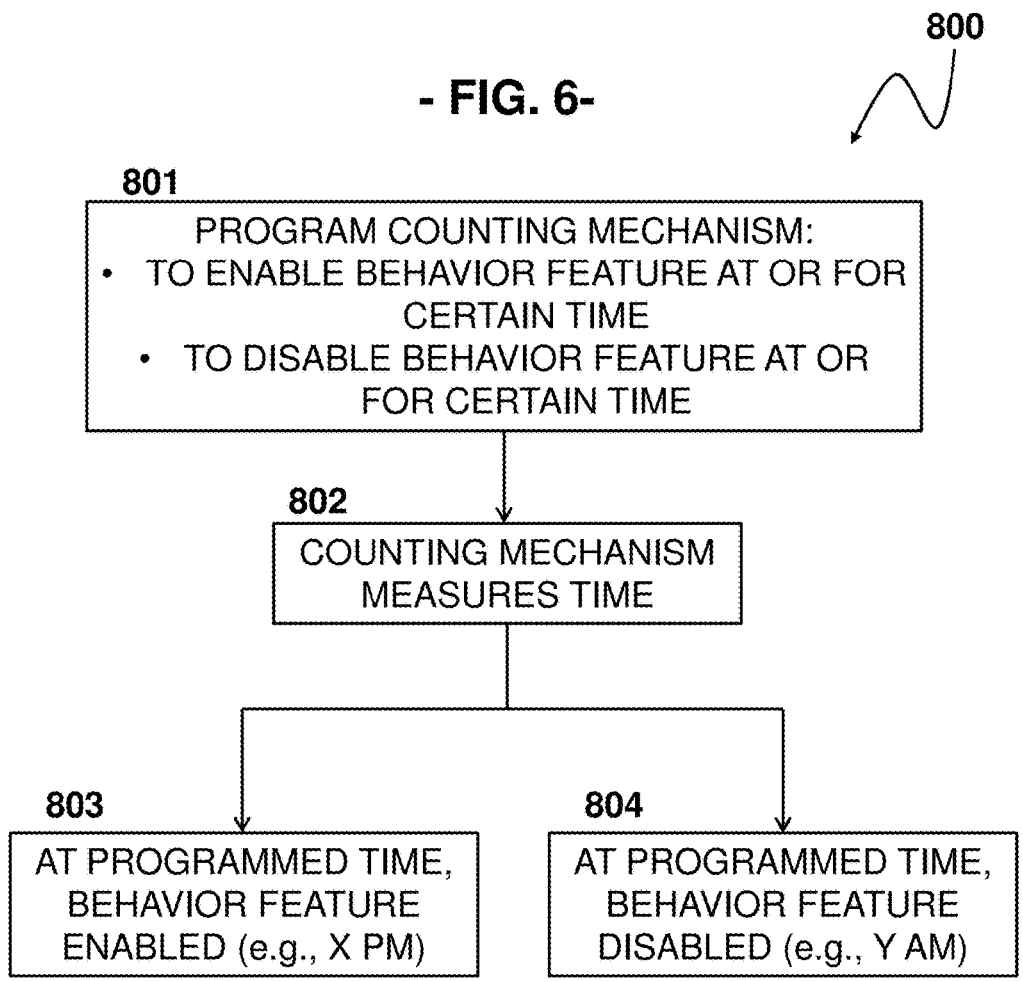

BEHAVIOR-DETERRING COLLAR WITH EMERGENCY OVERRIDE

CROSS-REFERENCE TO RELATED APPLICATIONS

This application is a divisional of U.S. patent application Ser. No. 14/815,960, filed Aug. 1, 2015, which was granted on Sep. 4, 2018 as U.S. Pat. No. 10,064,391, and which further claims the benefit of U.S. Provisional Application Ser. No. 62/032,105, filed on Aug. 1, 2014, and U.S. Provisional Application Ser. No. 62/053,130, filed on Sep. 20, 2014, both of which are entitled "Integrated Building Occupant Protection System for Persons and Pets," the entirety of the prior disclosures being incorporated by reference herein.

TECHNICAL FIELD

The present disclosure relates to the field of pet products and, specifically, to those products for deterring specific animal behaviors. In particular, the present disclosure provides one such product in the form of a collar-associated collar command unit, which is responsive to a building occupant protection system (including, for example, a fire alarm unit). The collar command unit overrides the behavior-deterring features, when the building occupant protection system detects a threat.

BACKGROUND

One known technique to discourage a dog from barking or from performing another behavior is to outfit the dog with a collar or similar device capable of administering a deterring stimulus when the dog exhibits the undesirable behavior. The device is capable of detecting when the dog is barking or vocalizing by sensing vibrations in the dog's throat. The device then delivers a deterring stimulus to the dog, such as an electric shock, discomforting vibration, a sprayed chemical irritant, or a sound. The deterring stimulus typically lasts as long as the dog barks or vocalizes. When the dog ceases to make sounds, the deterring stimulus stops. In this way, such anti-bark devices purport to do no lasting harm to the dog, and the dog is trained to not bark, thereby avoiding the deterring stimulus.

A similar device is used to train a dog to stay in a particular area. The dog's owner or handler will designate a geographic area within which the animal is to remain. If the dog approaches or crosses the boundary of the geographic area, the device will deliver a deterring stimulus to the dog. Over time, the dog learns to stay within the designated geographic area.

One difficulty in utilizing such devices is the threat of harm to dogs, in the event of an emergency or dangerous situation. For example, a dog trapped in a burning building will bark and attempt to leave its designated geographic area, even if its collar is delivering a deterring stimulus. Thus, a dog may sustain severe injury from prolonged exposure to chemical irritants or from a prolonged electric shock, while performing a behavior that might actually be desirable in the specific exceptional circumstance.

A pet owner or animal trainer can manually disable such anti-bark functions on such devices in certain circumstances. For example, a dog's owner might enable the anti-bark function of the dog's collar at night to prevent the dog from barking while the owner's family is sleeping, but disable the collar during the day when the family is awake and interacting with the dog. However, such manual changes do not provide adequate protection for the dog in emergency situations. By their nature, emergencies (such as a fire, earthquake, or intruder) capture the dog owner's immediate attention and minimize the dog owner's opportunity to disable the anti-bark collar, thereby putting the dog at risk of serious injury or death.

What is needed in the industry is a behavior-deterrent collar, which incorporates a deterrent stimulus that can be disabled in the event of an emergency. An additional benefit would be realized by providing a collar having a means for locating a dog during an emergency event.

SUMMARY OF THE PRIOR ART

There are a number of bark-control or perimeter-control collars described in the patent literature, a few of which are summarized below. Additionally, there are examples of collars being provided with tracking chips. However, none of the prior art teaches a behavior-deterring collar, which interacts with the alarm system of the home to disable the deterring stimulus and/or to pinpoint the location of the pet.

U.S. Pat. No. 6,079,367 describes an apparatus used for training animals, especially dogs. The apparatus takes the form of a collar to be worn by a dog. The collar is capable of receiving a coded radio signal. When the collar receives such a signal, it delivers a stimulus (e.g., an electric shock) to the dog. A human training the dog can use a boundary wire to set an area within which the dog is desired to remain. If the dog attempts to leave the area, it receives a stimulus from the collar. This perimeter-control collar can be adjusted to deliver different types of stimuli, different frequencies of stimulus, and different intensities of stimulus.

U.S. Pat. No. 7,420,473 describes a collar whose function is to assist the pet's owner in determining the pet's location in the event of an emergency. The collar uses a radio frequency transmitter that works in cooperation with a smoke detector, carbon monoxide alarm, or security alarm. When the collar perceives an emergency situation, the collar begins to sound an audible alarm, and a light flashes on the collar to assist the owner in locating the pet.

European Patent No. EP 1,551,220 describes an animal collar that detects vibrations from the animal's vocal cords. When the collar detects these vibrations, it sprays a chemical substance to the animal's face to deter the animal from barking or vocalizing. The collar administers successively larger doses of the chemical substance if the animal fails to stop barking or vocalizing.

U.S. Pat. No. 8,783,212 describes an animal collar with an integrated electronics system. The patent describes devices that are not merely "receivers" or "transmitters" but that are capable of delivering an electrical or electronic signal to an animal wearing the device. This is embodied in a bark-control collar that sends an electric shock to a dog when the bark-control collar detects the dog barking.

U.S. Pat. No. 8,862,378 describes a security and tracking system, apparatus, and method used to locate persons, animals, and possessions in an emergency situation. A signaling unit, which includes a GPS antenna, a cellular antenna, a radio antenna, or a wireless antenna, can be placed in an animal collar, thereby allowing the pet owner to locate the animal wearing the collar if the animal is lost or stolen.

What the prior art fails to show is any means whereby the stimulus generated by the collar can be automatically and selectively controlled in circumstances where such stimulus may be inappropriate or unwanted. Moreover, the prior art fails to teach a collar that communicates with a building occupant protection system (including an alarm unit) to identify the specific location of a pet in the event of an emergency.

BRIEF SUMMARY

A pet collar is provided with a collar command unit, which may include a stimulator feature for discouraging undesirable behavior (e.g., barking or leaving a designated geographic area) and a sensor for detecting the undesirable behavior. A controller in the collar command unit electronically communicates with the stimulator and the sensor. The collar command unit also includes a receiver for receiving or perceiving an event signal, for example, from a remote device, such as a building occupant protection system or cellular telephone, which is indicative of an emergency situation. When the pet exhibits the undesirable behavior, the controller allows the stimulator to deliver a deterrent stimulus. However, when the event signal is received or perceived, the controller overrides the behavior-deterring feature, preventing the delivery of the deterrent stimulus to the pet for exhibiting the behavior. Additionally or alternately, the collar may include a transmitter for transmitting a response to the remote device and a tracking chip for tracking the location of the pet during or after the event.

In one embodiment, the present disclosure relates to a pet collar that provides the pet with a deterrent stimulus, such as an electric or static shock, a sound, a chemical irritant spray, a vibration, a light, or a clamping pressure applied to the pet's skin. The behavior stimulus is delivered by a stimulator, which is mounted on a strap of the collar, within a strap of the collar, or on the collar command unit. The present collar command unit prevents the stimulator from delivering the behavior stimulus, when the receiver receives an event signal indicative of a triggering threat having been detected.

The collar's feature of deterring an undesirable action or behavior can be enabled, disabled, or overridden. When a pet performs the undesirable behavior, the sensor detects the undesirable behavior. Assuming the behavior-deterring feature is active (i.e., enabled and not overridden), the detection of the undesirable behavior causes the stimulator to deliver a deterrent stimulus to the pet. If the behavior-deterring feature is not active (i.e., disabled or overridden), the stimulator will not deliver a deterrent stimulus to the pet, even if the sensor detects that the pet is exhibiting the undesirable behavior.

In the event of a triggering threat (such as an environmental hazard or other emergency), an electronic receiver in the collar command unit receives an event signal. If the behavior feature is enabled, the receipt of the event signal overrides the behavior-deterring feature for a period of time. If the stimulator is providing a behavior-deterring stimulus to the animal at the time the event signal is received, the stimulus is stopped. Overriding the behavior-deterrent feature in the event of a triggering threat (e.g., a fire) prevents the pet from being corrected for exhibiting the behavior during the event.

In another embodiment, when the electronic receiver receives an event signal, a tracking feature within the collar command unit is activated for a period of time. The tracking feature is deactivated when the period of time has lapsed.

In one or more embodiments, when the electronic receiver receives an event signal, a transmitter within the collar command unit is activated for a period of time. The transmitter transmits a signal to a building occupant protection system. The signal may include data that the building occupant protection system uses to identify that the signal was sent by a collar associated with a pet and/or to determine that the behavior deterrent feature was overridden. Moreover, the signal may also include data that the building occupant protection system uses to recognize the identity of the pet associated with the collar and to determine the specific location of the pet.

The present device is normally used on the neck of an animal as part of a collar, but the scope of the invention is not limited to use on the neck. In one embodiment, the device is intended to prevent the pet from barking or other vocalization. In other embodiments, the device is intended to keep the pet within a designated geographic area; to track or locate the pet; to monitor the health or activity of the pet; and/or to identify the pet and its owner. In the latter cases, there is no functional need for the device to be placed on the neck because the device does not need to detect vibrations in, or sounds from, the pet's throat. Accordingly, the device may be located elsewhere on the pet, and the device may be used for pets other than dogs (such as cats).

In one embodiment, the present collar works in conjunction with a building occupant protection system. When the building occupant protection system detects a triggering threat, the system transmits an event signal to an electronic receiver in the collar command unit worn by the pet. Once the electronic receiver receives the event signal from the building occupant protection system, the behavior-deterring feature is overridden, preventing the stimulator from delivering a deterrent stimulus to the pet for exhibiting the behavior.

In another embodiment, a hazard detector is mounted on or within the collar or collar command unit. When the hazard detector detects a hazard (such as smoke) or an audible warning signal (such as the sound of an alarm unit), the hazard detector transmits an event signal to the electronic receiver, which overrides the behavior-deterring feature.

In a further embodiment, the receiver itself functions as a detector, for example, of smoke, heat, or another hazard. When the electronic receiver detects one or more hazards, the controller overrides the behavior-deterring feature.

These and other aspects of the present disclosure will now be described by way of example with reference to the detailed disclosure and the accompanying figures.

BRIEF DESCRIPTION OF THE DRAWINGS

A full and enabling disclosure of the present products and methods, including the best mode thereof and directed to one of ordinary skill in the art, is set forth in the present specification, which make reference to the appended figures, in which:

FIG. 1 is a schematic perspective view of a pet collar having a collar command unit, according to the present disclosure;

FIG. 2A is an exemplary block diagram, which illustrates the steps taken to deter an animal that is wearing the collar command unit of FIG. 1 from exhibiting undesirable behavior;

FIG. 2B is an exemplary flow diagram, which illustrates the steps taken to prevent an animal that is wearing the collar command unit of FIG. 1 from leaving a designated geographic area;

FIG. 3 is an exemplary flow diagram according to one aspect of the present disclosure, which illustrates the steps taken in response to a threat sensed by one of a building occupant protection system, a collar-mounted hazard detector, or a receiver in the collar command unit;

FIG. 4A is an exemplary flow diagram according to another aspect of the present disclosure, which illustrates the steps taken to override a behavior-deterring feature in the collar command unit of FIG. 1, in response to an event signal transmitted to a receiver in the collar command unit; and FIG. 4B is an exemplary flow diagram according to yet another aspect of the present disclosure, which illustrates the steps taken to override a behavior-deterring feature in the collar command unit of FIG. 1, in response to a manual command from a remote device;

FIG. 4C is an exemplary flow diagram according to another aspect of the present disclosure, which illustrates the steps taken to locate a pet wearing a collar command unit of FIG. 1 (but without a behavior-deterring stimulator), in response to an event signal transmitted to a receiver in the collar command unit;

FIG. 5 is an exemplary flow diagram according to a further aspect of the present disclosure, which illustrates the steps taken to locate a pet wearing a collar command unit of FIG. 1, in an embodiment where a receiver in the collar command unit scans for an event signal in response to vocalization from the pet or in response to a time variable; and FIG. 6 is an exemplary flow diagram according to an aspect of the present disclosure, which illustrates the steps taken to automatically enable and disable the behavior-deterring feature of the collar command unit of FIG. 1, using a counting mechanism contained therein.

DETAILED DESCRIPTION

Reference will be made now in detail to embodiments of the inventive products and methods, one or more examples of which are illustrated in the drawings. Each example is provided by way of explanation of the invention(s), not limitation of the invention(s). In fact, it will be apparent to one of ordinary skill in the art that various modifications and variations can be made in the present invention without departing from the scope or spirit of the invention. For instance, features illustrated or described as part of one embodiment may be used with another embodiment to yield a still further embodiment. Thus, it is intended that the present invention covers such modifications and variations as fall within the scope of the appended claims and their equivalents.

One embodiment of the present pet collar command unit 4 is shown in FIG. 1. The collar command unit 4 is affixed to a collar 1 having a strap 2 that is made from fabric, leather, plastic, fiberglass, a combination thereof, or from another material having acceptable structural integrity. The strap 2 can be tightened or loosened around the animal's body with the use of a closure device 3. As illustrated, the closure device 3 is a buckle and a series of holes. However, other closure devices may instead be used, including, but not limited to, latches, snaps, hook-and-loop (VELCRO®) fabrics, magnets, buttons, and/or combinations thereof.

The collar command unit 4 is associated with the strap 2. The collar command unit 4 may be integral with the strap 2, as illustrated, or may be mounted to the strap 2, for example, by feeding the strap 2 through slots on a rear surface of a housing 18 of the collar command unit 4. In yet another embodiment (not shown), the collar command unit 4 may be a pendant-type device, which is hung from the strap 2. Finally, although illustrated as having a generally rectangular shape, it should be understood that the collar command unit 4 may have any shape deemed comfortable for a particular pet, while being sized appropriately to house the component hardware and being located conveniently for access by the pet owner.

The collar command unit 4 includes a processing unit (or "controller") 11 that is operably connected to a receiver 7 and, optionally, a transmitter 16. The controller 11 may include a counting mechanism, or timer, 17. The collar command unit 4 also includes and a power supply 9 and, optionally, an on/off switch or button 5. In some instances, the power supply 9 is a battery and is perhaps a rechargeable battery. In some cases, the power supply 9 may be wirelessly rechargeable. A light 15 may be used to indicate that the collar command unit 4 is active and/or that an event mode is active and/or that the power supply 9 needs recharging. In some instances, the collar command unit 4 may include a user interface 10 operably connected to the controller 11.

Sensors:

The collar command unit 4 may further include a bark detector 6, one or more hazard detectors (collectively referred to herein with the numeral 8), and a tracking chip 12 (such as a GPS tracking chip conforming to NMEA 3.01 protocol; a Wi-Fi tracking chip conforming to IEEE 802.11 protocol or its subsequent versions; or a BLUETOOTH® low-energy beacon conforming to IEEE 802.15.1 protocol, its equivalents, or subsequent versions), all of which are operably connected to the controller 11. Additionally, sensors 14, such as vibration detectors or vital monitoring detectors, may be mounted in or on the inside face of the strap 2 and be operably connected through the strap 2 to the controller 11. The vibration detectors 14 detect vibrations caused by actions, such as barking or growling, from the animal's vocal cords. In another case, the bark detector 6 detects sounds, vibrations, or a combination thereof, eliminating the need for strap-mounted vibration detectors 14.

Sensors may detect one or more of the location of the collar command unit 4, angular position of the device, accelerometer, data, gravity sensor data, gyroscope data, lateral acceleration, rotation vector, step counter, step detector, charging status, or bark recognition, any of which (alone or in combination) is suggestive of the collar command unit 4 being worn by the pet at the time of the event signal.

In a further instance, the tracking chip 12 detects the pet's location relative to the boundaries of a pre-determined perimeter and/or the pet's global position. The tracking chip 12 may be used in collar command units 4 that do not include a bark detector 6 or vibration detectors 14, but which may or may not include a behavior-deterring stimulator 13 (discussed below). That is, the collar command unit 4 may serve only to assist the pet owner in locating the pet in an emergency situation by providing location information in transmissions to a remote device. With this location capability, the collar command unit 4 is useful for pets not known for vocalizing (such as cats) or for pets whose behavior ordinarily does not require stimulation to correct.

Some tracking chips use the proximity of the pet to a predefined boundary, such as a buried wire, to trigger the stimulator 13. When the pet approaches or crosses the boundary, the tracking chip 12 detects the pet's location and, assuming the behavior-deterring feature is active (i.e., enabled and not overridden), the stimulator 13 is allowed to deliver a deterrent stimulus to the pet to encourage the pet to return to the designated area.

Other tracking chips (e.g., Wi-Fi or BLUETOOTH®-based chips) create a virtual boundary defined by the strength of the signal between a base unit and the pet's collar. With these tracking chips, a constant signal is provided to the collar command unit 4 by a separate base station, when the behavior-deterring feature is active (i.e., enabled and not overridden). If the pet strays beyond the designated boundary and outside the range of the wireless transmission, the absence of the signal prompts the stimulator 13 to deliver a stimulus to the pet to encourage the pet to return to the designated area.

Interestingly, this same technology can be employed for bark control override as well. In a scenario contemplated herein, the absence of the transmission signal overrides the bark-control behavior feature. Such a configuration may be useful for overriding bark control when a pet is taken for a walk outside the predefined geographic area. Additionally, in the event of an emergency, it may be useful for the bark control feature to be overridden (for example, by the alarm unit), if the frightened pet leaves the designated area and the pet's barking aids the pet owner in locating the pet.

The tracking chip 12 may include Global Positioning Satellite (GPS) technology that determines the pet's global location. The GPS-based tracking chip may be used alone or in conjunction with one of the other types of tracking chips described above. In one embodiment, the perimeter control feature may rely on the strength of a wireless signal (e.g., a Wi-Fi or BLUETOOTH® signal), while the GPS tracking chip may be used to determine the location of the pet after the pet has strayed from the predefined geographic area or after the alarm unit has stopped transmitting the event signal. With this configuration, the GPS tracking chip becomes enabled when the pet is beyond the range of the wireless signal.

When a GPS-based tracking chip is used for perimeter control, the pet owner or his designee defines a boundary within which the pet is to remain. When the perimeter control behavior-deterring feature is active (i.e., enabled and not overridden) and the pet crosses the boundary, the stimulator 13 delivers a deterrent stimulus to the pet to encourage the pet to return to the designated area.

One or more various other sensors may be present or substituted in the collar command unit 4, including, but not limited to: a sensor that monitors the animal's vital signs; a sensor that functions as a transceiver to receive and send wireless data; a sensor that functions as a receiver to receive wireless data; a sensor that functions as a slave device that receives instructions from a separate master device; a sensor that functions as a BLUETOOTH® device; and a sensor that is a combination of one or more vibration detectors 14, a device used for location 12, and/or a BLUETOOTH® device.

Stimulator:

In one embodiment, the collar command unit 4 delivers a deterrent stimulus when sensors (6 and/or 14) detect a behavior that is undesirable or when the tracking chip 12, as part of a perimeter control system, detects a straying behavior that is undesirable. Although illustrated in FIG. 1 as prongs that deliver an electric or static shock to the pet, the behavior-deterring stimulator 13 may alternately or additionally include one or more of: (a) a mechanism that sprays or releases non-toxic chemicals, such as scented chemicals; (b) a noisemaker that produces a warning or unpleasant sound that is audible to the pet (e.g., at a frequency heard by a pet, but not necessarily a human); (c) a mechanism that produces vibrations that are felt by the pet; (d) a mechanism that produces light (e.g., a flashing light) in a spectrum visible to the pet; and (e) a mechanism that clamps or asserts pressure onto the skin of the pet.

It should be understood that the scope of the present disclosure is not limited to any particular type of inhibiting stimuli. For example, the inhibiting stimuli may include sounds that are too high in pitch for humans to hear or odors to which a pet is particularly sensitive.

In one aspect, a pet owner or trainer employs the user interface 10 on the collar command unit 4: (a) to enable and disable the behavior-deterring feature of the collar command unit 4; (b) to enable and disable one or more sensors (6, 12, 14) that determine if the undesirable behavior is being exhibited by the pet; (c) to enable and disable the stimulator (e.g., 13) that delivers the correctional stimulus to the pet; and/or (d) to adjust the level of deterrent stimulus applied to the pet.

Alternately, or additionally, a pet owner or trainer uses a wireless signal from a separate device, such as a cellular telephone application: (a) to enable and disable the behavior-deterring feature of the collar command unit 4; (b) to enable and disable one or more sensors (e.g., 6, 12, 14) that determine if the undesirable behavior is being exhibited by the pet; (c) to enable and disable the stimulator (e.g., 13) that delivers the correctional stimulus to the pet; and/or (d) to adjust the level of deterrent stimulus applied to the pet. The wireless signal is recognized by the receiver 7 of the collar command unit 4.

For simplicity, reference is made herein to the inhibition of a single type of undesirable behavior at a time. However, it should be understood that the present collar 1 and collar command unit 4 may be used to inhibit two types of undesirable behavior, using the same or different stimulators 13 and sensors 6, 12, 14. For example, the bark detecting sensor 6 and/or the vibration sensors 14 may be used to sense unwanted vocalization by the pet, which is corrected by the stimulator 13. Additionally, the tracking chip 12 may be used to determine if the pet has strayed outside a geographic boundary, in which case the same or a different stimulator 13 may be used to encourage the pet to return to the designated area. It also should be understood that each behavior-deterring feature may be enabled or disabled individually or together, as dictated by the needs of the pet owner.

Receiver:

The receiver 7 is an electronic device, as described below, which receives an event signal. The receiver 7 may also be comprised of transceiver, or any other multi-functional device that is able to receive a wireless signal. Within the collar command unit 4, the receiver 7 is coupled (a) directly to the controller 11, which is coupled to other devices within the collar command unit 4; or (b) to any or all the components within collar command unit 4, either directly or indirectly by any means known in the art. In some instances, the receiver 7 receives a wireless signal from a building occupant protection system. Alternately, the receiver 7 may receive a wireless signal from a separate device, such as a remote device (e.g., cellular telephone operated by the pet owner or a signal from a third-party monitoring service).

More specifically, the receiver 7 may comprise any device for receiving wireless data, such as a wireless communication module where the signal is compatible with the communication protocol standards for (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. In one version contemplated herein, the receiver 7 comprises a BLUETOOTH® transceiver, such as a BLUETOOTH® low-energy beacon, examples of which are an HC-05 wireless radio frequency transceiver and an HM-10 iBeacon chip. With these low-energy beacons, the receiver 7 uses little operating power and operates in frequencies between 2400 and 2483.4 MHz (including a guard band of 2 MHz at the lower end of the frequency range and 3.5 MHz at the upper end of the frequency range). In one version, the receiver 7 uses a radio (broadcast) communications system, so that a visual line of sight between the receiver 7 and the transmitting device is not required, provided a quasi-optical wireless path is available.

In a first mode of operation, an event signal is transmitted to the receiver 7 from a building occupant protection system. In another mode of operation, the collar command unit 4 contains one or more hazard detectors 8 that detect hazards, such as smoke, heat, carbon monoxide, or loud sounds, such as sirens from fire or burglar alarms, fireworks, or gunfire. When the hazard detector 8 detects one or more of these hazards, the hazard detector 8 transmits an event signal to the receiver 7. In an alternate mode of operation, the receiver 7 itself is equipped as a hazard detector that detects hazards, such as smoke, heat, carbon monoxide, or loud sounds, and that interprets the detection of the hazard as an event signal.

Transmitter:

According to another aspect of the present disclosure, the collar command unit 4 is provided with a transmitter 16 that transmits a wireless signal to a separate device when activated. The wireless transmitter 16 may also be comprised of transceiver, or any other multi-functional device that is able to transmit a wireless signal. In one exemplary case, the wireless transmitter 16 is coupled to the controller 11, which is coupled to other devices within the command unit 4. In another instance, the wireless transmitter 16 within the collar command unit 4 may be electrically connected to any or all the components within collar command unit 4 either directly or indirectly by any means known in the art.

More specifically, the wireless transmitter 16 may comprise any device for sending wireless data, such as a wireless communication module where the signal is compatible with the communication protocol standards for (a) wireless local area networks (WLANs, such as Wi-Fi) and/or (b) wireless personal area networks (WPANs, such as wireless USB, BLUETOOTH®, X-BEE®, ZIGBEE®) and/or (c) cellular telephone communications (such as short message service (SMS) and multimedia messaging service (MMS)) and/or (d) any other wireless protocol, such as IEEE 802.11 or its subsequent versions. The transmitter 16 may also include a Wi-Fi or cellular-capable chip. In one version contemplated herein, the transmitter 16 transmits data wirelessly to a building occupant protection system. In other versions, the transmitter 16 transmits data wirelessly to a remote device, such as a cellular telephone associated with the pet owner or a device associated with a third-party monitoring company.

In one exemplary configuration, the wireless transmitter 16 comprises a BLUETOOTH® transceiver, such as a BLUETOOTH® low-energy beacon, examples of which are an HC-05 wireless radio frequency transceiver and an HM-10 iBeacon chip. With these low-energy beacons, the transmitter 16 uses little operating power and operates in frequencies between 2400 and 2483.4 MHz (including a guard band of 2 MHz at the lower end of the frequency range and 3.5 MHz at the upper end of the frequency range). In one version, the transmitter 16 uses a radio (broadcast) communications system, so that a visual line of sight between the transmitter 16 and the receiving device is not required, provided a quasi-optical wireless path is available.

In some versions of the present collar command unit 4, the pet owner may program the controller 11 with contact information for the person(s) to be notified in the event that a triggering threat is detected. Such contact information may include the phone number, e-mail address, or other contact information for one or more persons to be notified. When a triggering event is detected, the wireless transmitter 16 may alert the contact(s) programmed into the memory of the controller 11, for example, by calling, sending an e-mail, and/or sending an SMS or MMS text message to a device (such as a cellular telephone) having an application for receiving such messages.

In at least one example, the transmitter 16 may use a Subscriber Identity Module (SIM) card or a Global System for Communication (GSM) connection to connect to the internet, using general packet radio service (GPRS) on the 2G and 3G cellular communications system's global system. Advantageously, because the transmitter 16 is capable of sending short message service (SMS) text messages, the collar command unit 4 functions similarly to a cellular telephone, which may be useful in the event that the building lacks electricity or internet connection.

In some instances, the transmitter 16 may wirelessly connect to a remote device or remote station and may rely on the remote device or station's telephone circuit or internet connection for transmitting a message. For example, the transmitter 16 from the collar command unit 4 may transmit a message to a remote device (e.g., an alarm unit) in a building, and the remote device may use the building's home telephone line or internet connection, using a Wi-Fi circuit, to communicate with the pet owner, third-party monitoring company, or emergency service personnel.

It should be understood that, although the receiver 7 and the transmitter 16 are described as separate components of the collar command unit 4, a single component (such as a transceiver) may be capable of functioning as both the receiver 7 and the transmitter 16. Thus, the present disclosure is intended to encompass both collar command units 4 having separate receivers 7 and transmitters 16 and collar command units 4 having integrated transceivers having receiving and transmitting functions.

Counting Mechanism:

In one or more embodiments, the controller 11 includes a counting mechanism 17 to determine a time variable specific to a particular action or response.

In a first case, when the receiver 7 receives or recognizes an event signal of a triggering threat, the controller 11 initiates a response from the transmitter 16, as discussed above. Simultaneously, the controller 11 initiates the counting mechanism 17 for a prescribed period of time, during which period the transmitter 16 is active. When the prescribed period of time lapses, the transmitter 16 is turned off without the need for intervention by the pet owner. The counting mechanism 17 may also use the same or a different prescribed period of time to define a period during which the behavior-deterring feature is overridden (a "cooling-off" period), after which period the behavior-deterring feature is returned automatically to an enabled setting without intervention by the pet owner. By using the counting mechanism 17 for the re-enablement of the deterrent feature, it is not necessary for the pet to be within close enough proximity to the alarm unit transmitter to receive a signal indicating the threat is no longer detected.

In a second case (shown in FIG. 6), the controller 11 initiates the counting mechanism 17 for a period of time during which a pet might exhibit an undesirable behavior that is to be deterred. For example, the counting mechanism 17 may be used to define a block of time (such as during the night) during which the pet is to be deterred from barking. When the counting mechanism 17 reaches the end of the prescribed period of time (e.g., 8 hours) or reaches a designated time (e.g., 8:00 a.m.), the controller 11 disables the behavior-deterring feature without the need for subsequent intervention by the pet owner. The pet owner may set the prescribed period of time, via the user interface 10 or via a wireless signal transmitted by a remote device (e.g., a cellular telephone) that is received and processed by the receiver 7.

The counting mechanism 17 may comprise any method of keeping or telling time, including, but not limited to, a real-time clock (RTC), a hardware clock, a clock generator, a timer chip, a timing integrated circuit, a timer, or a third-party counter identifier, such as may be accessible via an internet connection. In one version contemplated herein, the counting mechanism 17 is a hardware clock. In another version, the counting mechanism 17 may additionally use a RTC to track the date and time. While reference may be made herein to the counting mechanism 17 counting down a prescribed period, it should be recognized that the counting mechanism 17 may instead measure time to a prescribed point in time (such as a particular hour), based on settings of a real-time clock or other mechanism.

In one implementation of the present collar, the hardware clock utilizes a millis( ) function, which is part of the core library of the ARDUINO® open-source computer hardware and software company. The millis( ) function is used to determine the number of milliseconds that have lapsed since a given task was started/reset. The return value will overflow to 0 after approximately 49.7 days (2^32 milliseconds). The millis( ) counting is derived from the controller frequency (16 MHz on most ARDUINO® boards) and, therefore, is only as accurate as the crystal oscillator or ceramic resonator used on the board. The millis( ) timing is based on Timer0 of the board.

In addition to the hardware clock described above, the counting mechanism 17 may further include a real-time clock (RTC) to keep the date and time. One exemplary RTC suitable for such purpose is a "DS3231" time-keeping chip, which is commercially available from ARDUINO®. The DS3231 is a low-cost, extremely accurate 120 real-time clock with an integrated temperature-compensated crystal oscillator (TCXO) and crystal resonator, which incorporates a battery input and which maintains accurate timekeeping when main power to the device is interrupted. The integration of the crystal resonator enhances the long-term accuracy of the device.

The RTC maintains seconds, minutes, hours, day, date, month, and year information. The date at the end of the month is automatically adjusted for months with fewer than 31 days, including corrections for leap year. The clock operates in either the 24-hour or 12-hour format with an AM/PM indicator. Two programmable time-of-day alarms and a programmable square-wave output are provided. Address and data are transferred serially through an I2C bidirectional bus. A precision temperature-compensated voltage reference and comparator circuit monitors the status of the positive supply voltage (VCC) to detect power failures, to provide a reset output, and to automatically switch to the backup supply when necessary. Additionally, the reset (RST) pin is monitored as a push-button input for generating a microprocessor (µP) reset.

When a pet owner acquires the collar command unit 4, it may be necessary for the pet owner to set up the collar command unit 4 to interact with a building occupant protection system, as will be discussed further herein. The pet owner may use the user interface 10 to set up the collar command unit 4. Alternately, the pet owner may use a remote device, such as a cellular telephone or computer, which communicates wirelessly with the collar command unit 4. Each collar command unit 4 is preferably provided with at least one of the following unique identifiers: a Media Access Control (MAC) address, a Service Set Identification (SSID), or an Internet Protocol (IP) address. In one embodiment, the collar command unit 4 is provided with a MAC address, which is imprinted onto a network card in a read-only format. Additionally, the pet owner may assign a device name to the collar command unit 4 to affiliate the unique identifier with the collar 1 and to affiliate the collar command unit 4 with a particular pet (e.g., "Fido's Collar").

FIG. 2A is an exemplary flow diagram of the steps 100 taken to discourage a pet that is wearing the collar command unit 4 from exhibiting an undesirable action or behavior. When the behavior feature is active (i.e., enabled and not overridden) (step 102), the stimulator 13 is set to deliver an adverse stimulus to the pet if the pet exhibits the undesirable behavior (step 107). If the behavior-deterring feature is not active (e.g., is disabled or overridden) (step 102, 112), then the stimulator 13 will not deliver an adverse stimulus to the pet (step 105) for exhibiting that particular behavior (e.g., barking or otherwise vocalizing).

When the behavior-deterring feature is enabled, sensors (e.g., 6, 12, or 14) monitor whether the pet is exhibiting the undesirable behavior (step 104) and detect when the pet does exhibit the undesirable behavior (step 106). If the pet does not exhibit the undesirable behavior, the stimulator 13 does not deliver a deterrent stimulus to the pet (step 105) for exhibiting the behavior. When the pet does exhibit the undesirable behavior (step 104), the sensor (e.g., 6, 12, or 14) detects the undesirable behavior (step 106), and the stimulator 13 delivers an adverse stimulus to the pet (step 107), unless an override command has already been received or is received by the collar command unit 4 to override the stimulator feature (step 112). When the sensors (e.g., 6, 12, or 14) detect that the undesirable behavior has stopped (step 108), or if the behavior-deterring feature has been overridden (step 112), the stimulator 13 stops delivering the adverse stimulus to the pet (step 109). The behavior feature may be overridden (step 112) by an event signal, which is transmitted either by a human user (as shown in FIG. 4B) or by a component building occupant protection system (as shown in FIGS. 3 and 4A). If the pet continues the undesirable behavior and if the behavior feature has not been overridden, the stimulator 13 continues to deliver the adverse stimulus to the pet (step 107) for a predefined period of time measured by the counting mechanism 17.

FIG. 2B is an exemplary flow diagram of the steps 200 taken to discourage a pet that is wearing the collar command unit 4 from leaving a designated geographic area. A human user designates the area within which the animal is to remain (step 151), for example, by burying wires in a yard or by defining a zone using Wi-Fi or GPS systems that interact with the tracking chip 12 in the collar command unit 4. When the stimulator feature is enabled and not overridden (step 152), the stimulator 13 is set to deliver an adverse stimulus to the pet on any such occasions when the pet approaches the boundary of the designated area (as in the case of buried wires) or strays outside the boundary (as in the case of Wi-Fi or GPS systems) (step 157). If the deterrent feature is not enabled (e.g., is overridden) (step 152, 162), then the stimulator does not deliver an adverse stimulus to the pet (step 155) for exhibiting that particular behavior (for example, leaving the designated area).

When the pet does leave the designated area (step 154), the tracking chip 12 detects that the pet is outside the designated area (step 156), and the stimulator 13 delivers an adverse stimulus to the pet (step 157). When the pet returns to the designated area (step 158), or if the behavior feature has been over-ridden (step 162), the stimulator 13 stops delivering the adverse stimulus to the pet (step 159). The behavior feature may be overridden (step 162), either by a human user or by an event signal (as shown in FIGS. 3, 4A, and 4B). If the pet continues remains outside the designated area and if the behavior feature has not been overridden, the stimulator 13 continues to deliver the adverse stimulus to the pet (step 157) for a predefined period of time measured by the counting mechanism 17.

The present collar command unit 4 may be operated in conjunction with a building occupant protection system, which may be used to override the behavior-deterring features of the collar 1 in the event of an emergency. The building occupant protection system may include one or more alarm units or threat detectors, which generate an event signal when a triggering threat—including, but not limited to, fire, smoke, carbon monoxide, carbon dioxide, earthquake, or forcible entry—is detected.

The alarm units in the building occupant protection system may include transmitters, receivers, and/or transceivers for communicating with the collar command unit 4 and, in some instances, with a remote device (such as a cellular phone) associated with the pet owner or a computer associated with a third-party monitoring company. The alarm units in the building occupant protection system may further produce an audible signal, as a notification for the building's occupants.

As with the collar command unit 4, the alarm units in the building occupant protection system may require initialization before first use. Specifically, each alarm unit may be pre-programmed by, or on behalf of, the pet owner (or home owner or occupant) to affiliate the alarm with a particular room in which the alarm is installed (e.g., "Master Bedroom" or "Kitchen"). Each alarm unit—with its own MAC address or other unique identifier—communicates its location to the other alarm units, in the event of an emergency. The alarm units work cooperatively with one another to identify the location of the pet within the building, as described below. More details about the building occupant protection system may be learned from a review of U.S. patent application Ser. No. 14/815,996, entitled "Integrated Building Occupant Protection System for Persons and Pets," filed concurrently herewith, the disclosure of which is hereby incorporated by reference herein in its entirety.

FIG. 3 illustrates the steps 300 taken in response to a threat sensed by one of a building occupant protection system, a collar-mounted hazard detector 8, or a receiver 7 in the collar command unit 4. The building occupant protection system is armed to detect threats (step 301). Alternately, or in addition, hazard detectors 8 or the receiver 7 in the collar command unit 4 may be equipped to detect threats, including the audible signal from an alarm unit sensing a threat (also step 301). If no triggering threat is detected by the building occupant protection system, the hazard detectors 8, or the receiver 7 (step 301), then no event signal is generated (step 302). The building occupant protection system remains in a monitoring state, and the collar command unit 4 remains in its normal operational state, which may include behavior-deterring features for vocalization and/or perimeter control. In its normal operational state, the transmitter 16 of the collar command unit 4 is inactive (that is, not transmitting a signal).

If one or more triggering threats are detected by the building occupant protection system or by the hazard detectors 8 (step 301), then a transceiver in the building occupant protection system and/or the hazard detectors 8 generates an event signal (step 303). The event signal is transmitted to the receiver 7 of the collar command unit 4 (step 304). If the receiver 7 has the capability to detect a threat, the receiver 7 interprets the threat stimulus (e.g., smoke, heat, or a sound from an alarm unit) as a threat. Once the threat has been communicated to or recognized by the receiver 7, the controller 11 activates an "event mode," and the controller 11 overrides the behavior-deterring feature (step 306), if previously enabled, to prevent the pet from being disciplined for exhibiting the behavior during the event.

The event mode is activated each time an event signal is received, or perceived, by the receiver 7. The counting mechanism 17 is reset by the controller 11, when the event mode begins and at each time an event signal is received by the receiver 7. That is, the counting mechanism 17 does not operate on a delay, which prevents subsequent event signals from being received and acted upon. Rather, the counting mechanism 17 is reset with each event signal, and the prescribed period to be measured by the counting mechanism 17 is, in effect, measured from the last received event signal.

FIG. 4A is an exemplary flow diagram, which illustrates the steps 400 that occur when an event signal overrides the behavior feature of the collar command unit 4, without human involvement. As described above, when an event signal is generated (step 303) by the building occupant protection system (and/or the hazard detectors 8), the signal is communicated to the receiver 7 of the collar command unit 4 (step 304), and the controller 11 activates the event mode. The controller 11 overrides the behavior feature (step 306), and a stimulus is not delivered to the pet during the event for exhibiting the behavior (step 109).

When the collar command unit 4 enters its event mode, the transmitter 16 may transmit a wireless signal to a remote device (step 411), as will be discussed in further detail below. When an event signal is no longer generated (step 412), or the counting mechanism 17 reaches the end of a prescribed interval, several actions occur: namely, the event mode is deactivated; and the behavior feature override is turned off (step 413). Thus, at the end of the event time period, the behavior feature is returned to pre-event settings. As before, the counting mechanism 17 is reset with each event signal, and the prescribed period to be measured by the counting mechanism 17 is measured from the last received event signal.

FIG. 4B is an exemplary flow diagram, which illustrates the steps 500 that occur when a human being selectively overrides the behavior feature of the collar command unit 4, based on receipt of an event signal from the building occupant protection system or the hazard detector 8 in the collar command unit 4 itself. When an event signal is generated (step 303) by the building occupant protection system (and/or the hazard detectors 8), the signal is communicated wirelessly to a first remote device (e.g., cellular phone of the occupant or the computer of a third-party monitoring company of the building occupant protection system) (step 552) for action by an operator of the device (step 553). If the operator of the device does not elect to deliver an event signal (step 553), no signal is transmitted to the collar command unit 4 (step 554), and the behavior feature is not overridden.

However, if the operator of the first remote device chooses to deliver an event signal (step 553), an event signal is transmitted to the receiver 7 associated with the collar command unit 4 (step 304). In this instance, the event mode is activated, and the behavior feature is overridden (step 306). With the event mode activated, the transmitter 7 may transmit a wireless signal to the first remote device or to a second remote device, such as an alarm unit in the building occupant protection system (step 411). When an event signal is no longer received (step 412), the operator sends a second signal to re-enable the stimulator 13 (not shown), or the counting mechanism 17 indicates the event time period has expired (step 415). At this point, the event mode of the collar command unit 4 is deactivated, and the behavior feature override is turned off (step 413). Thus, at the end of the event time period, the behavior feature is returned to pre-event settings.

FIG. 4C is an exemplary flow diagram, which illustrates the steps 600 that occur to locate a pet in such embodiments of the present collar that do not include a behavior-deterring stimulator 13. In this instance, an event signal is generated (step 303), as described above. The event signal is transmitted to the receiver 7 in the collar command unit 4 (step 604). The receipt of the event signal by the receiver 7 causes the controller 11 to activate the transmitter 16 to deliver a response signal (step 611) to a device, such as an alarm unit of the building occupant protection system. Using the response signal(s) from the transmitter 16, the building occupant protection system determines the location of the pet (step 612), as discussed in further detail below. Optionally, the building occupant protection system communicates the location of the pet (step 613), either through an audible announcement or through a message sent to a device, such as the pet owner's cellular phone (also discussed below). If the event signal continues to be received (step 614) and the pet remains in the vicinity of the alarm unit, the transmitter 16 continues to send a response signal (step 611). However, if the event signal ceases (or if the pet has evacuated the building and is no longer receiving the event signal), the transmitter 16 does not send a response signal (step 615).

In one embodiment, sensors in the collar command unit 4 may be used to determine if the pet is moving or active before the event signal being transmitted to the receiver 7 (step 604) and the response signal being transmitted by the collar command unit 4 (step 611). Sensors may detect one or more of the location of the collar command unit 4, angular position of the device, accelerometer, data, gravity sensor data, gyroscope data, lateral acceleration, rotation vector, step counter, step detector, charging status, or bark recognition, any of which (alone or in combination) is suggestive of the collar command unit 4 being worn by the pet at the time of the event signal. This optional step increases the confidence of the pet owner in assessing the location of his pet, rather than just the collar command unit 4 associated with the pet that may have been removed for some reason.

FIG. 5 is an exemplary flow diagram according to a further aspect of the present disclosure, which illustrates the steps taken to locate a pet wearing a collar command unit of FIG. 1. In this embodiment, a receiver in the collar command unit scans for an event signal either in response to vocalization from the pet or with some periodic frequency. In some instances, it may be desirable to have the receiver 7 activated to receive event signals, for example, from the building occupant protection system, when prompted by vocalization from the pet or with some periodic frequency. Such a system may be useful in conserving battery life in the power supply 9.

In this process 700, when the sensors 6 or 14 detect vocalization (e.g., barking) from the pet or with some periodic frequency dictated by the counting mechanism 17 (step 701), the controller 11 activates the receiver 7 (step 702). The receiver 7 scans for an event signal (step 703), which is indicative of a threat or triggering event. If no event signal is being received, the controller 11 determines whether the collar 1 is provided with a stimulator 13 (step 705). If the collar 1 is equipped with a stimulator feature, the process proceeds according to FIG. 2A.

Otherwise, the event signal is received by the receiver 7 (step 704), prompting the controller 11 to direct the transmitter 16 in the collar command unit 4 to transmit a response signal to the device (step 711). Using the response signal(s) from the transmitter 16, the building occupant protection system determines the location of the pet (step 712), as discussed in further detail below. Optionally, the building occupant protection system communicates the location of the pet (step 713), either through an audible announcement or through a message sent to a device, such as the pet owner's cellular phone (also discussed below). If the event signal continues to be received (step 714) and the pet remains in the vicinity of the alarm unit, the transmitter 16 continues to send a response signal (step 711). However, if the event signal ceases (or if the pet has evacuated the building and is no longer receiving the event signal), the transmitter 16 does not send a response signal (step 715).

In any of the embodiments shown in FIGS. 4A, 4B, 4C, and 5 and as described above, when the receiver 7 receives the event signal and the controller 11 activates its event mode, the controller 11 may also activate the transmitter 16 of the collar command unit 4. The transmitter 16 transmits a response signal to the building occupant protection system. (It should be understood that, if a transceiver is used in place of the receiver 7 and the transmitter 16, the controller 11 initiates the transmitting function of the transceiver.)

The signal transmitted by the transmitter 16 in the collar command unit 4 is received by a receiver (or transceiver) in at least one of the alarm units of the building occupant protection system. Each alarm unit in the building occupant protection system preferably has a controller that processes the received signal and that recognizes that the response came from a collar command unit 4 associated with a pet. If the collar command unit 4 has been previously associated with a particular dog or other pet, the alarm unit recognizes the particular pet assigned to that collar command unit 4. For instance, the building occupant protection device recognizes the unique identifier of the collar (e.g., the device name, MAC address, SSID, and/or IP address associated with "Fido's Collar").

Alternately, the alarm unit in the building occupant protection system recognizes the type of device (that is, a collar command unit 4) that is sending a response signal and associates that type of device with a pet. Multiple pets, each equipped with its own collar command unit 4, may be recognized individually ("Fido's Collar" and "Fluffy's Collar") or collectively ("two pets detected".)

In some cases, the response from the transmitter 16 on the collar command unit 4 may convey information, such as, but not limited to, location, angular position of the device, accelerometer data, gravity sensor data, gyroscope data, lateral acceleration, rotation vector, step counter, step detector, charging status, or bark recognition, any of which (alone or in combination) is suggestive of the collar command unit 4 being worn by the pet at the time of the event signal. In other words, such information assists the building occupant protection system in assessing the likelihood that a particular collar command unit 4 is being worn by the pet and prevents the building occupant protection system from locating a particular collar command unit 4 that is not being worn by the pet. In other instances, the controller 11 may process one or more of the above pieces of information to determine if the pet is wearing the collar command unit 4. If the pet is not wearing the collar command unit 4 that has received the event signal, the controller 11 does not activate the transmitter 16 to send a response transmission.

The building occupant protection system uses one or more of time-distance arrival of the signal, triangulation using multiple devices, trilateration, received signal strength indicator (RSSI), radio-frequency (RF) fingerprinting, and GPS, which allow the building occupant protection system to determine the particular location within the building where the pet is located. In one embodiment, when one of the alarm units in the interconnected network of the building occupant protection system detects an environmental threat, every alarm unit in the system uses close range (nearest sensor) technology to pinpoint the location of the pet within the building.

Specifically, when an alarm unit detects a threat, each alarm unit preferably sends a transmission to seek the presence of a pet wearing the present collar 1, and, in response, the transmitter 16 of the collar command unit 4 sends a response signal for a prescribed period of time, which is received by one or more alarm unit(s) in the vicinity of the pet. Having the response signal from the collar command unit 4 cease after the prescribed period allows the receiving alarm unit in the building occupant protection system to assess the strength of signal, for example, to determine the likelihood of a pet being in the same room as the alarm unit. To be considered as an indicator of the pet's location, the strength of signal is preferably above a certain, pre-defined threshold. The strength of signal received by other alarm units in the system is compared simultaneously with that received by the first alarm unit to determine if the pet is closer to a different alarm unit (and, therefore, in a different room).

In one embodiment, the building occupant protection system determines the location of the pet and broadcasts an audible assessment report at a certain frequency. Upon hearing the assessment report that includes the location of the pet (e.g, "Fido detected in Living Room"), the pet owner may quickly locate his pet, even if the pet is hiding beneath a couch or a bed. This process may be repeated for multiple pets, each with its own collar command unit 4 (e.g., "Fido detected in Living Room" and "Fluffy detected in Kitchen") Alternately, if the collar command unit 4 is not associated with a particular pet by name, the broadcast message may include only that a pet was detected in a particular room ("Pet detected in Bedroom 2").

As long as the building occupant protection system is in event mode (that is, having detected a threat), each alarm unit will continuously broadcast the event signal. In one version, when the receiver 7 of the collar command unit 4 receives each event signal, the controller 11 resets the counting mechanism 17 that determines how much longer the controller 11 will remain in event mode.

In another embodiment, the controller 11 activates the tracking chip 12, when an event signal is received. The activation of the tracking chip 12 allows the pet owner, the building occupant protection system, or a third-party monitoring company to track the location of the pet by GPS or similar tracking services. Thus, the pet owner is able to determine whether the pet wearing the collar command unit 4 is within the building or whether the pet is safely outside.

With reference to steps 304, 604, and 704 shown in FIGS. 3, 4A, 4B, 4C, and 5, it should be appreciated that the building occupant protection system and collar command unit 4 may normally operate in a communication mode, where the system and collar command unit 4 are routinely transmitting and receiving signals from one another. In this configuration, instead of an event signal being transmitted to the receiver (steps 304, 604, 704), the absence of a signal—that is, a break in the communication—may be indicative of an event having been detected. Alternately, the building occupant protection system may send a different type of signal (e.g., a signal at a different frequency) when an event is detected to differentiate the event signal from routine transmissions. Thus, both the receipt of an event signal and the lack of receipt of a signal are contemplated herein.

The building occupant protection system may also conduct a test by transmitting an event signal, even though an actual threat is not detected. In this instance, the collar command unit 4 performs as though an event signal is received by sending a response transmission (from the transmitter 16) and by overriding the stimulator 13 for a prescribed period of time.

FIG. 6 is an exemplary flow diagram according to an aspect of the present disclosure, which illustrates the steps taken to automatically enable and disable the stimulator feature of the collar command unit of FIG. 1, using a counting mechanism contained therein. This process 800 may be useful, for instance, when enabling bark control for an extended period. The pet owner programs the collar command unit 4 to enable the bark control feature at a certain time or for a certain period of time (step 801). Similarly, the pet owner programs the collar command unit 4 to disable the bark control feature at a certain time or for a certain period of time (step 801). For example, the pet owner may choose to have the bark control enabled at nighttime, beginning at 9 P.M. and continuing for 10 hours (until 7 A.M.).

The counting mechanism 17 in the collar command unit 4 measures the time (step 802). As discussed above, if a real-time clock is used as the counting mechanism, the counting mechanism 17 indicates when the specified times are reached, and the controller 11 enables the bark control feature (step 803) or disables the bark control feature (step 804), as appropriate. When the counting mechanism 17 is active, the stimulator feature is disabled. When the counting mechanism 17 becomes inactive, the stimulator feature is enabled automatically and without further intervention by the pet owner. Other counting mechanisms may be used instead of, or in addition to, the real-time clock.

The preceding discussion merely illustrates the principles of the present behavior-deterring collar and its method of operation. It will be appreciated that those skilled in the art may be able to devise various arrangements, which, although not explicitly described or shown herein, embody the principles of the inventions and are included within their spirit and scope. Furthermore, all examples and conditional language recited herein are principally and expressly intended to be for educational purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Terms such as "first", "second", and the like are intended only to aid in the reader's understanding of the drawings and are not to be construed as limiting the invention being described to any particular orientation or configuration, unless recited in the claims.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

What is claimed is:

1. A device for discouraging undesirable behavior from a pet, the device comprising:
   a collar command unit, the collar command unit comprising:
      a controller;
      a first sensor for detecting an undesirable behavior exhibited by the pet, the first sensor being in electronic communication with the controller;
      a behavior-deterring feature for delivering a deterrent stimulus to the pet, the behavior-deterring feature being in electronic communication with the controller; and
      a receiver for receiving an event signal, the receiver being in electronic communication with the controller;
      wherein, when the sensor detects the undesirable behavior exhibited by the pet, the controller allows the stimulator to deliver a deterrent stimulus to the pet; and
      wherein, when the receiver receives the event signal in response to a triggering threat, the controller overrides the behavior-deterring feature, thereby preventing the stimulator from delivering the deterrent stimulus to the pet for exhibiting the behavior.

2. The device of claim 1, further comprising a strap; wherein the collar command unit is one of: integrated with the strap; attached to the strap; and a pendant hung from the strap.

3. The device of claim 1, wherein the undesirable behavior detected by the first sensor and exhibited by the pet is one or more of vocalization and traveling outside a predefined geographic area.

4. The device of claim 1, wherein the behavior-deterring feature is a stimulator located on or within the collar command unit, the behavior-deterring feature comprising at least one of: (i) prongs that deliver an electric shock; (ii) prongs that deliver a static shock; (iii) a mechanism that sprays or releases non-toxic chemicals; (iv) a noisemaker that produces a warning sound audible to the pet; (v) a mechanism that produces vibrations that are felt by the pet; (vi) a mechanism that produces light in a spectrum visible to the pet; and (vii) a mechanism that clamps or asserts pressure onto the skin of the pet.

5. The device of claim 1, wherein the receiver receives a signal compatible with the communication protocol standards associated with one or more of (a) wireless local area networks; (b) wireless personal area networks; (c) cellular telephone communications; and (d) wireless protocol IEEE 802.11 and its subsequent versions.

6. The device of claim 5, wherein the receiver comprises a low-energy transceiver.

7. The device of claim 1, wherein the collar command unit further comprises a transmitter for transmitting a wireless response to the remote device, after the receiver receives an event signal.

8. The device of claim 1, wherein the transmitter transmits a signal compatible with the communication protocol standards associated with one or more of (a) wireless local area networks; (b) wireless personal area networks; (c) cellular telephone communications; and (d) wireless protocol IEEE 802.11 and its subsequent versions.

9. The device of claim 1, wherein the remote source is one of a building occupant protection system, a cellular telephone associated with a pet owner, and a device associated with a third-party monitoring company.

10. The device of claim 1, wherein the collar command unit comprises at least one second sensor, the at least one second sensor being in communication with the controller and being configured to detect at least one triggering threat; and wherein the triggering threat is one or more of fire, smoke, carbon monoxide, carbon dioxide, radon, earthquake, loud noises, and forcible entry.

11. The device of claim 1, wherein the collar command unit further comprises a tracking chip in communication with the controller, the tracking chip being activated by the event signal received by the receiver.

12. The device of claim 1, wherein the collar command unit further comprises a rechargeable power supply in communication with the controller.

13. The device of claim 1, wherein the controller further comprises a counting mechanism selected from the group consisting of a real-time clock (RTC), a hardware clock, a clock generator, a timer chip, a timing integrated circuit, a timer, and a third-party counter identifier; wherein the counting mechanism counts down a prescribed time interval beginning when the receiver receives the event signal; and wherein, when the prescribed time interval expires, the controller returns the behavior-deterring feature to an original setting.

14. A device for discouraging undesirable behavior from a pet, the device comprising:
   a collar command unit, the collar command unit comprising:
      a controller;
      a first sensor for detecting an undesirable behavior exhibited by the pet, the first sensor being in electronic communication with the controller;
      a behavior-deterring feature for delivering a deterrent stimulus to the pet, the behavior-deterring feature being in electronic communication with the controller; and
      a counting mechanism associated with the controller;
      wherein, if the behavior-deterring feature is not active when the counting mechanism reaches a prescribed time, the behavior-deterring feature is returned to an active setting automatically.

15. The device of claim 14, wherein the undesirable behavior exhibited by the pet is vocalization.

16. The device of claim 14, wherein the behavior-deterring feature uses a stimulator located on or within the collar command unit, the behavior-deterring feature comprising at least one of: (i) prongs that deliver an electric shock; (ii) prongs that deliver a static shock; (iii) a mechanism that sprays or releases non-toxic chemicals; (iv) a noisemaker that produces a warning sound audible to the pet; (v) a mechanism that produces vibrations that are felt by the pet; (vi) a mechanism that produces light in a spectrum visible to the pet; and (vii) a mechanism that clamps or asserts pressure onto the skin of the pet.

17. The device of claim 14, wherein the counting mechanism is selected from the group consisting of a real-time clock (RTC), a hardware clock, a clock generator, a timer chip, a timing integrated circuit, a timer, and a third-party counter identifier; and wherein the activity of the counting mechanism is triggered at a predefined time or continues for a predefined period.

* * * * *